Dec. 27, 1966     W. D. LONG ET AL     3,294,300

FUNNEL DEVICE FOR LONGITUDINALLY SPLITTING FILM

Filed June 7, 1965

WARNER D. LONG
DAVID C. WILLIAMS
INVENTORS

BY R. Frank Smith

Ronald J. Carlson

ATTORNEY AND AGENT

United States Patent Office 3,294,300
Patented Dec. 27, 1966

---

3,294,300
FUNNEL DEVICE FOR LONGITUDINALLY SPLITTING FILM
Warner D. Long and David C. Williams, Kingsport, Tenn., assignors to Eastman Kodak Company, Rochester, N.Y., a corporation of New Jersey
Filed June 7, 1965, Ser. No. 462,023
12 Claims. (Cl. 225—3)

This invention relates to longitudinal splitting of polymeric films, sheets, strips, and the like, to form coherent networks of fibers. More particularly the invention relates to a novel method and apparatus whereby incomplete longitudinal splitting of the film may be attained.

It has been previously proposed to utilize longitudinally split polymeric films in the manufacture of tying twines and cords because of its relatively high tensile strength and ability to resist various destructive elements that usually attack such articles such as rodents, insects, and weathering factors.

However, tying twines made from longitudinally split polymeric films suffer from the disadvantage of knot slippage when the twine is subjected to high tensile strengths. As a result tying twines of this type are of limited use. The slippage is apparently due to the slippery nature of the surface of the resulting polymeric filaments after splitting of the film.

Recently it was discovered that the disadvantage of knot slippage in tying twines made from longitudinally split polymeric films may be overcome by only partially splitting the film. In this manner residual "split-ability" is present in the tying twine manufactured from such partially split films. When knots are subsequently tied with the twine, the twisting produces further splitting in the area of the knot due to the residual "split-ability" present and slippage of the knot is substantially prevented.

From the above comments it is readily apparent that a successfull tying twine manufactured from longitudinally split polymeric film requires not only that the polymeric film be longitudinally split to a limited extent but that such partial splitting should also be substantially uniform along the width and length of the film.

Various methods of longitudinally splitting the polymeric film has been proposed in the prior art. Some of the less elaborate methods involve rubbing the film between two blocks, brushing the film by way of rotary brushes, beating the film with whips or hammers, and grating the film over a sharp edged tool. The more complex methods involve the use of air jets or supersonic vibrations.

All of these proposed methods involve one or more of the following disadvantages when a partially but uniformly split film is desired. Extensive control features would oftentimes be necessary to ensure that only a partial splitting is being performed. The basic apparatus for performing the splitting may be quite expensive either in construction or in operation or both. The flexibility of the apparatus in terms of capability of handling various film widths may be seriously limited.

Therefore, it is an object of the present invention to provide a novel method and apparatus which will partially split a longitudinally oriented polymeric film.

It is a further object of the present invention to provide a novel method and apparatus which will partially split a longitudinally oriented polymeric film in a continuous manner.

Another object of this invention is to provide a novel method and apparatus for producing a longitudinally split film suitable for use in manufacturing tying twines and cords.

These and further objects of this invention will be apparent from the following discussion and by reference to the accompanying drawings.

In accordance with the present invention a polymeric film which is oriented in a longitudinal direction is provided from a suitable source. The oriented film is then continuously passed through a zone while it is subjected to a circumferential compacting force and dragging friction. The combination of the compacting force and dragging friction on the film causes a partial splitting of the film in the longitudinal direction to take place. Thereafter the longitudinally split film may be processed into a tying twine wherein a knot may be formed anywhere along its length having substantially no slip.

The invention may be more completely understood by reference to the drawings wherein:

FIGURE 1 schematically depicts the continuous process and apparatus of the present invention.

Figure 1:
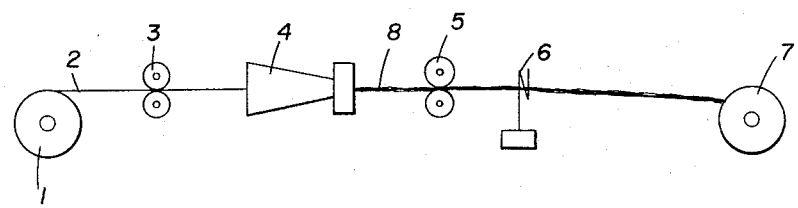

As shown in FIGURE 1, a longitudinally oriented polymeric film 2 is supplied to the continuous process by a supply roll 1. Rather than using a supply roll the film may be supplied directly from a longitudinal orientation process.

The longitudinally oriented film next passes between guide rolls 3 and through longitudinal splitting means 4 whereupon the film is split into a coherent network of fibers which possess residual "split-ability."

Rolls 5 are provided to pull the film through the longitudinal splitting means 4. These rolls are driven at the same rate as rolls 3.

The longitudinally split film 8 is thereafter guided by means 6 onto wind-up roll 7 for further processing as desired.

Rather than employing a wind-up roll the split film may be fed directly to a machine for manufacturing tying twine or cord.

Figure 2:
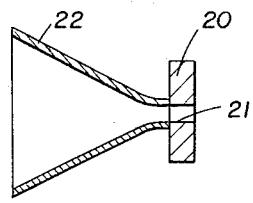
FIGURE 2 illustrates a sectional side view of one embodiment of the longitudinal splitting means employed in the apparatus.

FIGURE 2 shows one embodiment of the lonitudinal splitting means 4 in more detail. A compacting die 20 is provided with an orifice 21 through which the film is passed thus inducing a partial splitting in the film in the longitudinal direction.

The orifice of the compacting die must be of such a size and configuration that it forces the film to be compressed or squeezed upon itself while at the same time not creating an excessive drag on the film. The configurations contemplated may be regular or irregular. Generally the precise sizes and configuration of the orifice will depend on the dimensions of the film to be split.

A guide 22 is shown attached to the entrance side of the compacting die 20. The purpose of the guide is to allow the film to gradually assume the shape of the orifice thereby eliminating possible edge tearing that might occur with an abrupt change. As is apparent the size of the guide 22 will depend upon both the sizes of the film and the orifice 21.

The guide shown is funnel-shaped although other mechanical equivalents may be used with equal success.

Figure 3:
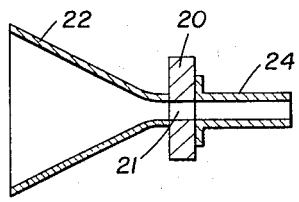
FIGURE 3 illustrates an optional feature which may be added to the device illustrated in FIGURE 2.

FIGURE 3 illustrates the same compacting die 20 and guide 22 as in FIGURE 2. However, an extension 24 has been added to the die which has an internal passage corresponding to orifice 21 of die 20. Thus an increased distance is provided during which the film is compressed and worked against itself. The result in an increase in the extent of longitudinal splitting of the film.

The extension 24 thereby provides a relatively simple means of further controlling the extent of film splitting within limits.

It is emphasized that the extension 24 is not necessary to the novel method and apparatus of the present invention but is merely an optional control feature which is relatively simple and easy to employ.

Figure 4:
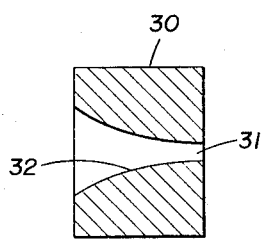
FIGURE 4 illustrates a sectional side view of another embodiment of the longitudinal splitting means.

In FIGURE 4 another embodiment of the longitudinal splitting means is illustrated. A compacting die 30 is provided which has incorporated thereinto an orifice 31 and an initial guide surface 32 communicating with the orifice.

The guide surface 32 functions in the same manner as the previously discussed guide 22 in FIGURES 2 and 3 and therefore its size would be subject to the same considerations discussed therein.

The compacting die 30, due to incorporation of the guide surface, will generally be of larger external size than compacting die 20.

The thus described apparatus may be operated at any speed which may be maintained, the limiting factors being in the initial film supply means and the subsequent withdrawal means.

The following example illustrates the operation of the present invention.

A polypropylene film was longitudinally drafted at a ratio of 10:1. The resulting film was 1.5 mils thick and 3½ inches wide. This film was passed through a longitudinal splitting device such as illustrated in FIGURE 2. The orifice of the device was circular in configuration and had a diameter of 0.100 inch. The total length of the orifice was 1.0 inch.

The resulting film was partially split in the longitudinal direction. Additional splitting could be obtained by again passing the partially split film through the device.

The films which may be longitudinally split according to this invention include those which have been highly oriented in one direction thereby rendering the film highly susceptible to splitting. This orientation varies over wide limits depending upon a number of factors some of which include the type of polymer employed in the film, the initial film dimensions, and the desired ease by which the film will split. As a result it is apparent that the draft ratio recited in the example is not limiting of the degree of orientation.

The dimensions of the films are not critical but with any particular film a suitably sized longitudinal splitting device should be used to obtain the necessary compacting and drag friction to produce the desired splitting.

The films may be of polymeric compositions which include polypropylenes, polyethylenes, polyamides, polyesters, polyvinyl chlorides, polyvinylidene chlorides, polyurethanes, polyallomers, polycarbonates, acetyl resins, and other compositions which may be molecularly oriented.

Thus having described the present invention it is to be understood that various changes and modifications may be made without departing from the spirit and scope thereof.

We claim:

1. A process for partially splitting a polymeric film which comprises the steps of:
    (a) moving an oriented polymeric film through a splitting zone,
    (b) foldng and compacting the film on itself while in said splitting zone,
    (c) and exerting a dragging force on the film while it is being folded and compacted and thereafter while it is in said splitting zone thereby inducing a partial splitting in the direction of movement of the film.

2. A process as defined in claim 1 wherein the oriented polymeric film is continuously moved through the splitting zone.

3. A process for partially splitting a polymeric film in a longitudinal direction which comprises the steps of:
    (a) supplying a source of unilaterally oriented polymeric film,
    (b) moving the polymeric film through a splitting zone,
    (c) folding and compacting the film on itself in a random manner while in said zone,
    (d) and exerting a dragging force on the film while it is being folded and compacted and thereafter while it is in said splitting zone thereby inducing a partial splittng in the direction of movement of the film.

4. A process as defined n claim 3 wherein the polymeric film is moved through a series of splitting zones and wherein the film is folded and compacted on itself in a random manner and subjected to a dragging force within each zone.

5. An apparatus for partially splitting a polymeric film which comprises:
    (a) means for supplying an oriented polymeric film,
    (b) compacting die means for partially splitting the film,
    (c) guide means for guiding the film into the compacting die means,
    (d) and means to move the film from the supply means through the guide means and through the compacting die means.

6. An apparatus for partially splitting a polymeric film which comprises:
    (a) means for supplying an oriented polymeric film,
    (b) compacting die means having a circular orifice for partially splitting the film,
    (c) guide means for guiding the film into the compacting die means,
    (d) and means to move the film from the supply means through the guide means and through the compacting die means.

7. An apparatus as defined in claim 6 wherein the guide means is a funnel device attached to the inlet side of the compacting die means and communicating with the orifice thereof.

8. An apparatus as defined in claim 6 wherein the compacting die means has an extension tube attached to the outlet side and communicating with the orifice thereof.

9. An apparatus as defined in claim 6 wherein the compacting die means has a circular orifice which is of relatively large diameter at the inlet side of the die means and tapers to a relatively small diameter at the outlet side of the die.

10. An apparatus as defined in claim 5 wherein the compacting die means is a device which has an orifice surrounded by confining surfaces.

11. An apparatus as defined in claim 5 wherein the compacting die means has an orifice which tapers from the inlet side to the outlet side.

12. An apparatus for partially splitting a polymeric film which comprises:
    (a) means for supplying an oriented polymeric film,
    (b) means for compacting and folding the film on itself in a random manner while also exerting thereon a dragging force so that the film is at least partially split by the circumferential compacting force and dragging friction, (c) guide means for guiding the film into the compacting and folding means, (d) and means to move the film from the supply means through the guide means and compacting and folding means.

References Cited by the Examiner

UNITED STATES PATENTS

| | | | |
|---|---|---|---|
| 2,979,433 | 4/1961 | MacHenry | 264—280 X |
| 3,161,920 | 12/1964 | Stalego | 28—72 X |

FOREIGN PATENTS 868,528  5/1961  Great Britain.

References Cited by the Applicant

UNITED STATES PATENTS

| | | |
|---|---|---|
| 2,185,789 | 1/1940 | Jacque. |
| 2,853,741 | 9/1958 | Costa. |
| 2,980,982 | 4/1961 | Costa. |
| 2,003,304 | 10/1961 | Rasmussen. |
| 3,112,160 | 11/1963 | Rush. |

FOREIGN PATENTS

| | | |
|---|---|---|
| 864,695 | 4/1961 | Great Britain. |
| 938,326 | 10/1963 | Great Britain. |

WILLIAM W. DYER, Jr., *Primary Examiner.*

J. M. MEISTER, *Assistant Examiner.*